(12) United States Patent
Kimmo et al.

(10) Patent No.: US 7,225,410 B2
(45) Date of Patent: May 29, 2007

(54) PORTABLE TELECOMMUNICATION APPARATUS AND METHOD FOR REQUESTING DOWNLOADING OF PAGES OF INFORMATION FROM A REMOTE SOURCE

(75) Inventors: Alanen Kimmo, Tampere (FI); Ojala Tommi, Tampere (FI)

(73) Assignee: Nokia Corporation, Espoo (FI)

( * ) Notice: Subject to any disclaimer, the term of this patent is extended or adjusted under 35 U.S.C. 154(b) by 275 days.

(21) Appl. No.: 09/732,294

(22) Filed: Dec. 8, 2000

(65) Prior Publication Data

US 2001/0003816 A1 Jun. 14, 2001

(30) Foreign Application Priority Data

Dec. 10, 1999 (GB) ................... 9929331.8

(51) Int. Cl.
*G06F 3/00* (2006.01)
(52) U.S. Cl. ...................... 715/748; 715/864
(58) Field of Classification Search ............... 345/760, 345/773, 771, 748, 740, 733, 156, 173, 840, 345/172; 715/501.1, 513, 748, 864; 709/217
See application file for complete search history.

(56) References Cited

U.S. PATENT DOCUMENTS

| | | | | |
|---|---|---|---|---|
| 5,854,624 A * | 12/1998 | Grant | ................ | 345/169 |
| 5,954,515 A | 9/1999 | Iggulden | ................ | 434/317 |
| 6,466,203 B2 * | 10/2002 | Van Ee | ................ | 345/173 |
| 6,532,004 B1 * | 3/2003 | Harrison et al. | ................ | 345/169 |
| 6,750,850 B2 * | 6/2004 | O'Leary | ................ | 345/169 |
| 2002/0032699 A1 * | 3/2002 | Edwards et al. | ................ | 707/513 |

FOREIGN PATENT DOCUMENTS

| | | |
|---|---|---|
| EP | 0 953 926 | 11/1999 |
| EP | 0 817 448 | 8/2004 |
| WO | 92/19065 | 10/1992 |
| WO | WO 97/49044 | 12/1997 |
| WO | 99/35595 | 7/1999 |
| WO | WO 99/35595 | 7/1999 |

OTHER PUBLICATIONS

European Search Report for Application EP 00 31 0998, Dated Oct. 27, 2003.
Http://www.wapguide.com/wapguide/auwap.pdf, Executive Summary, WAP White Pater, AU-System Radio, Feb. 1999.

* cited by examiner

*Primary Examiner*—Kieu D. Vu
(74) *Attorney, Agent, or Firm*—Foley and Lardner LLP

(57) ABSTRACT

An apparatus and associated method is disclosed for receiving a page of information from a remote source. The page contains a link to a linked page of information, and is displayed on a display. The apparatus is equipped with a user operable input device associated with the link. Actuation of the input device causes a request to be sent for the linked page to be transmitted to the apparatus.

17 Claims, 3 Drawing Sheets

PORTABLE TELECOMMUNICATION APPARATUS AND METHOD FOR REQUESTING DOWNLOADING OF PAGES OF INFORMATION FROM A REMOTE SOURCE

BACKGROUND OF THE INVENTION

This invention relates to a user interface for use particularly as part of a portable, or an in-vehicle (mobile) wireless telecommunications apparatus.

There is an ever-increasing demand to be able to access data from remote computers from anywhere via portable or mobile telecommunications devices. This is exemplified by the increase in the usage of WAP (Wireless Application Protocol). WAP allows users of mobile or portable phones to access specially designed WWW pages, and display them on the usually relatively small displays of their phones.

As display technology improves, and the price of displays drops, then it will become increasingly feasible to supply high-resolution pages of information to mobile or portable devices. This will be especially true for vehicle-mounted equipment where there is not such an emphasis on size constraints.

One of the advantages of the WWW is the manner in which one can easily jump from page to page via the use of so-called hypertext links. These can normally be identified from WWW pages by the use of a different colored typeface and underlining. To activate the link and go to the referenced page, when using a PC, the user simply moves the mouse to correspondingly move the cursor over the link text, and clicks the mouse button. This sends a request to the remote computer to send the new page of information. By following links in this manner, it is relatively straightforward to navigate around complex sites using only the mouse, with little or no keyboard intervention.

However, when using a mobile (i.e. vehicle-mounted) or portable (i.e. carried by hand) device, the provision of a suitable mouse-like device can be difficult, and even if it can be provided, using it while driving, for instance, can be dangerous. This problem can affect the ease with which the user can navigate the WWW, and consequently restricts the usefulness to the user of the WWW.

SUMMARY OF THE INVENTION

A first aspect of the present invention, is a telecommunication apparatus for requesting the download of respective pages of received information from a remote source comprising means for receiving respective pages of information including encoded information identifying respective links to other pages; a display for displaying the received pages; a fixed location input key, and a processor for consistently associating the input key with the encoded information identifying a respective linked page during a display period such that actuation of the input key during the display period requests the respective linked page for downl ad from the remote source.

For the display period, the operation resulting from actuation of the input key can then uniquely be determined by the association between the key and the encoded information identifying a respective linked page.

Respective input keys may be associated with encoded information identifying respective linked pages. This allows selection of a plurality of links on a page simply and quickly.

The key may be dedicated to this task.

Alternatively, the key may have other functions, depending on the mode of the apparatus. Particularly, it may be one of a group of keys provided for dialing.

Another alternative implementation of the user operable input means is the provision of a touch sensitive area on the display of the apparatus.

The remote source from which pages are downloaded is preferably capable of connection to the World Wide Web (WWW).

The page of information is preferably encoded using a markup language such as HTML or WML. This is then presented to the user in a manner controlled by the particular encoding used for each page.

The link to a linked page is preferably provided by means of a specific tag in the encoded page.

In a preferred embodiment, each page of information comprises a plurality of links to respective linked pages. Each link is associated with a respective input means.

According to a second aspect of the present invention, there is provided a method of requesting the download of respective pages of received information from a remote source comprising receiving respective pages of information including encoded information identifying respective linked other pages, the encoded information including a functional element for consistently associating operation of an identified input device with a request for download of the linked page, and a visual element for labelling the operation. The method comprises the steps separating the labelling and functional elements of the encoded information; displaying the labelling information at a predefined position and defining the function of the identified input device using the functional element of the encoded information such that on operation of the input device the respective linked page is requested for download.

In this aspect of the invention the defined function of the identified input device can then be consistently associated with the input device. The input device is preferably a fixed location input key.

For a better understanding of the present invention, and to understand how the same may be brought into effect, the invention will now be described, by way of example only, with reference to the appended drawings in which:

DETAILED DESCRIPTION OF THE INVENTION

Figure 1:
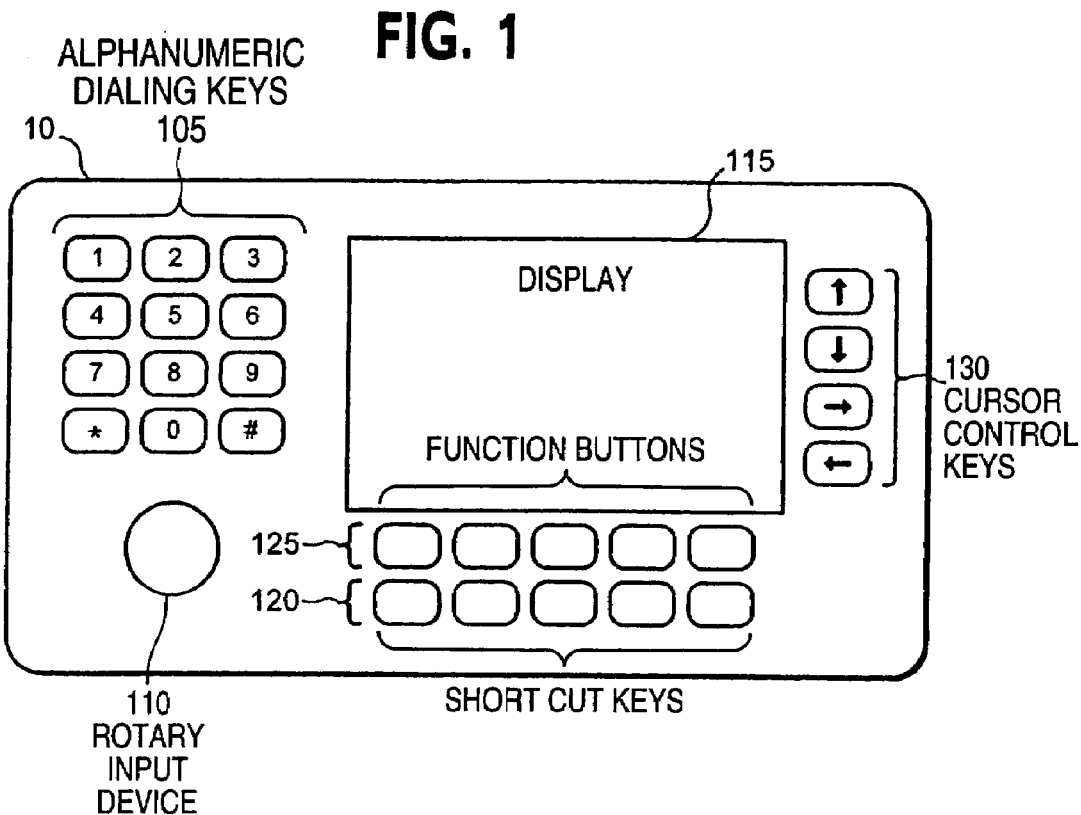
FIG. 1 shows an in-vehicle apparatus according to a first embodiment of the invention.

FIG. 1 shows a front panel of a mobile, or in-vehicle, telecommunications apparatus 10. The apparatus is intended to be permanently fixed in a vehicle, and not to be removed, and carried around by the user.

Such an apparatus is an example of an enhanced in-vehicle radio telephone. The enhancement lies in its ability to communicate with remote computer systems e.g. computers providing WWW pages, computers providing route guidance/navigation information.

FIG. 1 does not show a handset, as is normally used with in-vehicle telephones. However, a handset may be provided, as well as a separate speaker and microphone to allow hands free operation.

FIG. 1 shows a number of Input/Output (I/O) devices which may be used to control the operation of the apparatus. A standard set of alphanumeric dialling keys 105 are provided. Their primary function is to allow entry of telephone numbers for dialling. They may also have a secondary function allowing entry of alphabetic information by means of certain letters being associated with each key as has become common. e.g. 2=ABC, 3=DEF, 4=GHI etc.

A rotary input device 110 is also provided. This may have a different function depending on what function the apparatus is performing at any given time. For instance, if the apparatus is operating in hands free telephone mode, the rotary control 110 may act as a volume control for an external loudspeaker. If the user is browsing through a list of stored telephone numbers, the rotary control 110 may allow scrolling up and down the list.

A display 115 provides a means of providing visual information to the user of the apparatus. If the apparatus is operating in a route guidance mode, the display may present information about upcoming changes of direction. e.g. a large right-pointing arrow with the legend "Turn Right in 50 meters". If the user is accessing WWW pages, they will appear on the display device.

A number of function buttons 120 may be provided. A key may be provided to select each function of the apparatus. For instance, a key may be provided to select the Route Guidance function, another for WWW access, another for telephone mode and so on.

Cursor control keys 130 are provided to assist the user in entering or editing data. They may also be used to scroll through lists or pages of information.

Embodiments according to the invention provide shortcut keys 125 to assist the user in navigating pages of information provided by, or downloaded from, a remote computer. An example of the kind of information which may be provided is pages of HTML (Hypertext Markup Language) encoded information from the WWW. Another example of the kind of information which may be provided is pages of WML (Wireless Markup Language). The device may be compatible with the WAP (Wireless Application Protocol) standard.

Figure 2:
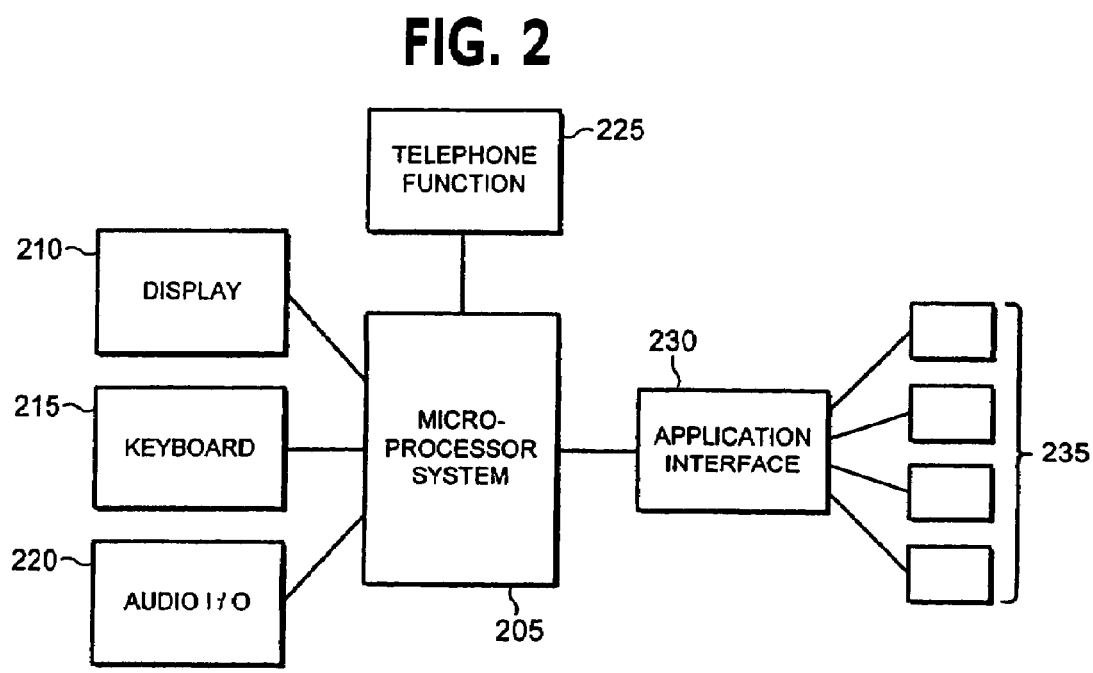
FIG. 2 shows a functional block diagram of some of the constituent parts of the embodiment of FIG. 1.

FIG. 2 shows a functional block diagram of some of the parts of the apparatus 10. At the heart of the system is the micro-processor system 205. This comprises a micro-processor device and the associated circuitry which the skilled man will realize is necessary to implement such a system e.g. RAM, ROM and power supply.

The micro-processor system is functionally connected to the display 210 and provides control signals to drive the display, and hence provide visual information to the user.

Also connected to the micro-processor system is the keyboard 215. This comprises all the keys and rotary input devices on the control panel of the apparatus. The keyboard may also comprise other types of input device such as a roller key, a rocker key or a joystick. The micro-processor system senses actuation of any key and performs the associated function according to its program code.

The Audio I/O 220 comprises the handset, if present, and the speaker and microphone necessary for hands free operation. Speech recognition and/or synthesis may also be provided.

The telephone function 225 is essentially a portable radio telephone as is known in the art, supplemented with a modem to allow the transmission and reception of data. The telephone function may of course allow the apparatus to be used as a regular telephone.

The application interface block 230 controls the interface to any peripheral functional blocks 235. These are not important in the understanding of the present invention, but as an example may comprise a GPS module for use with the route guidance system, an in-car entertainment system or extra programs for use in storing telephone numbers or contact details.

One of the primary uses of such apparatus will be to access WWW pages. These WWW pages are usually stored on a remote computer, and the user may request that a particular page be transferred from the remote computer to a temporary store within the user's local computer and then displayed. WWW pages comprise information to be displayed and marked up in accordance with rules which define the appearance of the text. These rules are defined in various HTML (Hyper Text Markup Language) specifications. The processor contains a markup language decoder, which interprets the received page. HTML is a simple coding system which controls how text is displayed and formatted on a display. Similarly, WML (Wireless Markup Language) may be used to define the pages. For instance, if a word is to appear in bold type face, then it may be encoded:

<BOLD>EXAMPLE TEXT</BOLD>

This will display the words 'EXAMPLE TEXT' in bold. The text qualifiers in angle brackets are called tags, and there a number of such tags which perform different functions in HTML. They all appear in angle brackets, and their functionality is ended by use of a forward slash as shown in the example.

A particular tag used in HTML is the anchor tag. This is used to identify a link to another page. Moving the cursor over the highlighted text will send a request to the remote computer to send the new page referenced by the anchor text. An example of such a link, and the coding producing it is given here:

For more information, <u>clickhere</u>. (Text as it appears on the display)

The underlying HTML code required to produce this display is:

For more information, <A HREF="HTTP://WWW.NOKIA.COM">click here. </A>

The anchor tag pair <A></A>surrounds only the words 'click here', and so only those words are shown underlined on the screen, and in turn are the only words which are related to the link encoded in the HTML.

In a regular PC environment, the user will simply move his cursor over the words 'click here', click the mouse button and the linked page referenced in the HTML, i.e. the Nokia Home Page in this example, will be sent to the user in response to the request.

However, as stated before, it is difficult to provide a suitable pointing device in a vehicular or portable environment, and so a different approach is needed to allow the user to follow links from one WWW page to the next.

An embodiment according to the invention provides a number of keys, each of which is associated with one of the links presented on a page of information. By actuating one of the keys, the user can then request the linked page specified by that particular link to be sent to him in the same way as if the user had been able to select the link using a mouse and cursor. The key may, for example, be a rocker key, joystick or a roller key as described earlier.

In a preferred embodiment, the keys are dedicated keys situated under the display. In the example shown in FIG. 1, five separate shortcut keys 125 are shown, but it is clear that any number may be provided. The keys could, however, be linked to form, for example, a multi-way rocker.

In order to associate each link with a key, it is necessary to introduce a new tag into HTML or WML. It is not important what the tag is called, but for the sake of clarity, and as an example only, the tag will herein be called SHORTCUT.

The proposed syntax for such a tag is:
<SHORTCUT KEYNUM={N} ACTION={URL} CAPTION={TEXT}>

All three arguments are mandatory, and there are no additional optional arguments.

KEYNUM identifies which of the shortcut keys is to be associated with the link. The keys may be numbered from the left, starting at 1, although this may be specified by the manufacturer of a particular terminal.

ACTION defines the location or URL (Uniform Resource Locator) of the link which is to be followed if the key is pressed.

CAPTION defines the text which will be displayed at the bottom of the display, immediately above the respective shortcut key. It will normally be a more meaningful description of the linked page that is provided by the URL. For instance, a typical line of HTML using this structure might read:
<SHORTCUT KEYNUM=1 URL="HTTP://WWW.NOKIA.COM" CAPTION="NOKIA HOME PAGE">

Alternatively, CAPTION may define a graphic image which is used to represent the link to the linked page. For instance, instead of the CAPTION argument reading CAPTION="NOKIA HOME PAGE" as above, the caption could be an image of the NOKIA logo i.e. CAPTION=/IMGS/LOGOS/NOKIA.GIF. Note that the file location which replaces the text to be displayed is not enclosed in quotation marks.

It is envisaged that as many such statements as there are shortcut keys will be used, although of course, there may be fewer links on a page than there are shortcut keys provided. However, if there are more links on a page than shortcut keys provided one of the keys could be used to change the consistent association to allow additional links to be available.

Figure 3:
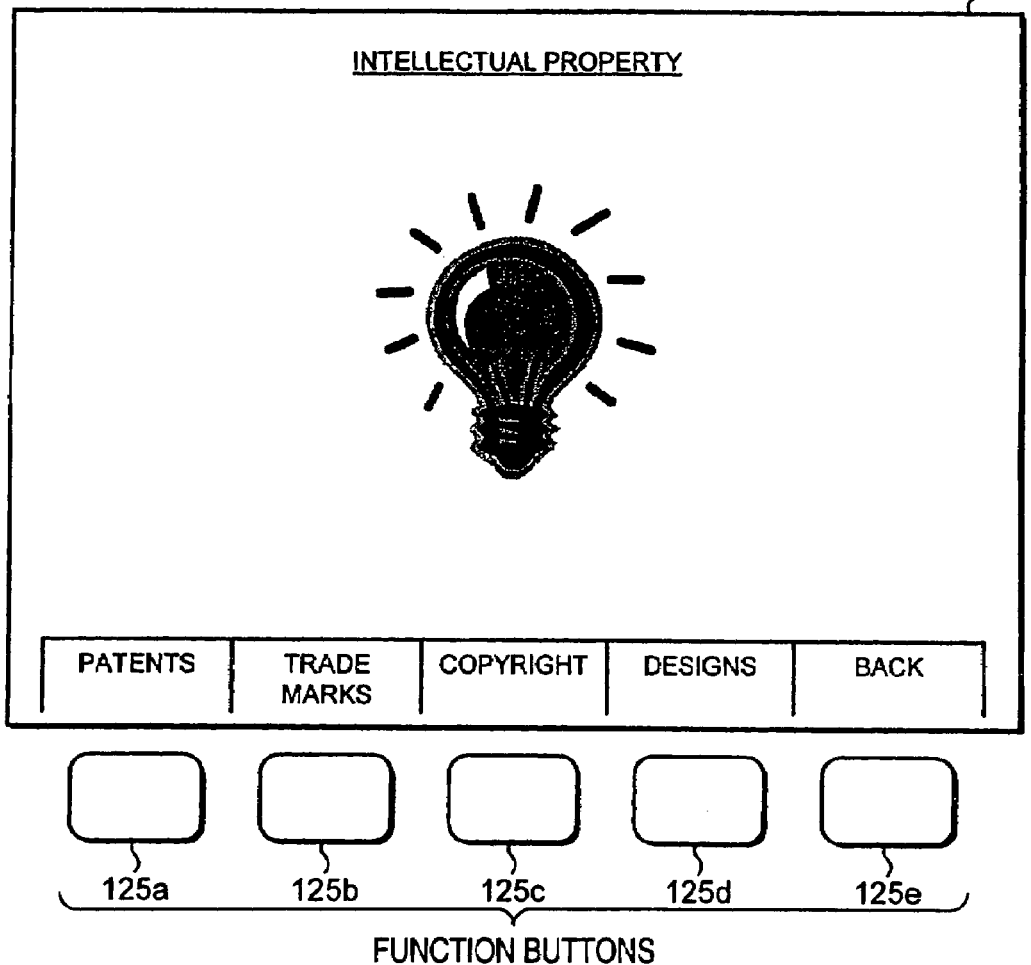
FIG. 3 shows an example display on the apparatus of FIG. 1.

FIG. 3 shows the display 115 and shortcut keys 125 as they would appear when a suitably coded page of information is displayed. In this example, the user wishes to discover more about intellectual property. The view shown is the title page of a further set of pages, and the links presented at the bottom of the display offer the user the choice of pressing key 125a for Patents, 125b for Trade Marks, 125c for Copyright, 125d for Designs or 125e to return to the previous page.

It is envisaged that content providers will produce specialized pages designed to be viewed on portable and mobile apparatus, which will contain the specially coded shortcut tags. Such pages may have less information on them than pages designed to be viewed using a regular PC, but they offer the added benefit of ease of navigation while on the move, or using an apparatus having a display of restricted size.

In an alternative embodiment, dedicated shortcut keys need not be provided. Instead, the alphanumeric keys 105 of the regular telephone keypad may be used. In this embodiment, the links may simply be numbered with the appropriate key then being pressed to access that link. While this option reduces the overall number of keys on the apparatus, it does not have the advantage of being able to place a concise description of the link in close proximity to the associated key.

Figure 4:
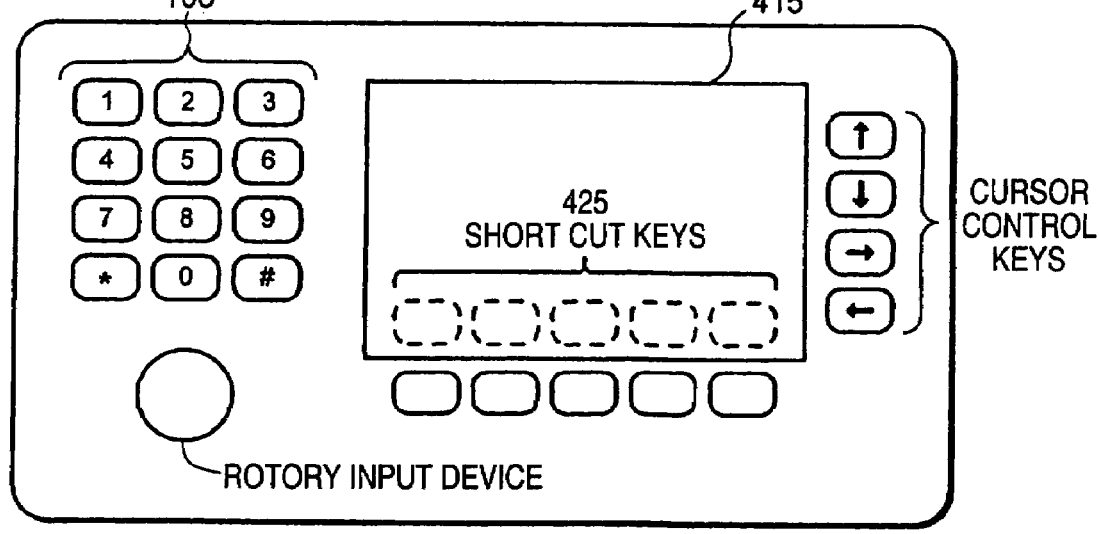
FIG. 4 shows an in-vehicle apparatus according to another embodiment of the invention.

In a further embodiment, as shown in FIG. 4, use may be made of touch screen technology. Instead of providing keys below the display 415, the functionality of such keys can be built into the display. A discrete area of the display is set aside for such inputs as shown in FIG. 4 which shows 5 areas 425 of the display sensitive to touch. The appropriate link text caption is simply displayed co-located with the touch sensitive areas. The user can then simply touch the caption corresponding with the link the user wishes to follow to send a request for the appropriate page to be sent to the user.

Figure 5:
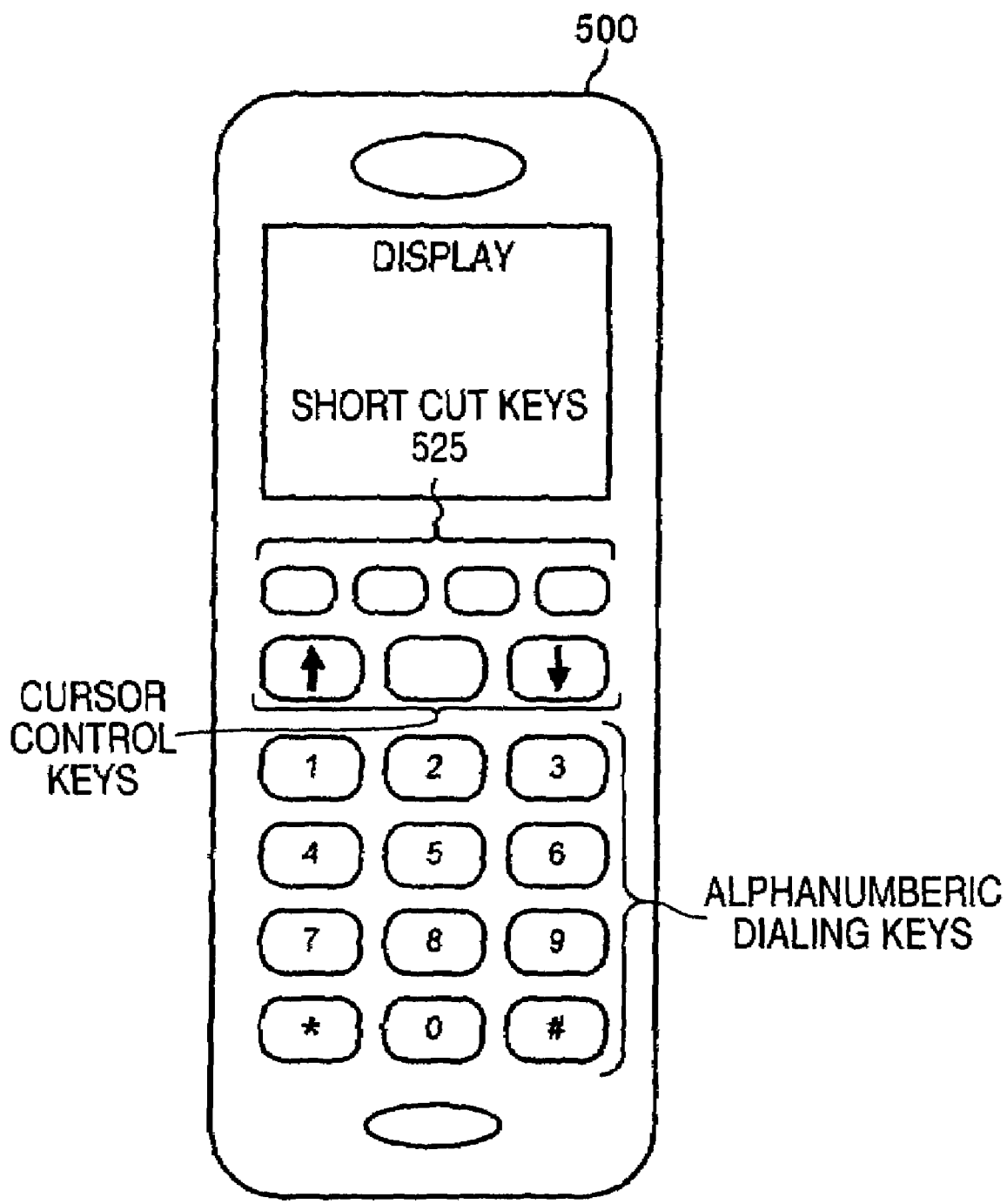
FIG. 5 shows a portable (i.e. handheld) apparatus according to a further embodiment of the invention.

The invention is not limited to use in only mobile wireless apparatus. It enjoys equal utility in portable, i.e. handheld, devices. FIG. 5 shows how the invention may be employed in a slightly different form in a portable apparatus 500. In this case, the apparatus is shown with all the regular parts of a portable telephone, but with the addition of 4 shortcut keys 525. Again, more or fewer shortcut keys may be provided—four being only an exemplary embodiment. In operation they function exactly as has been described in relation to the mobile apparatus.

In view of the foregoing description it will be evident to a person skilled in the art that various modifications may be made within the scope of the invention.

The present invention includes any novel feature or combination of features disclosed herein either explicitly or any generalization thereof irrespective of whether or not it relates to the claimed invention or mitigates any or all of the problems addressed.

What is claimed is:

1. A portable telecommunication apparatus for requesting the download of pages of information from a remote source comprising:

means for receiving a page of information including encoded information;

identifying at least a first link and a second link to other pages;

at least a first fixed location input key and a second fixed location input key aligned at an outside edge of a display, wherein the display is configured for displaying the received page and for displaying at least a first caption and a second caption indicative of said first link and said second link, respectively, aligned at an inside edge area of the display, in close proximity to the outside edge, in positions corresponding to the locations of the first fixed location input key and the second fixed location input key; and a processor for forming said first caption and said second caption from encoded information identifying the linked other pages and for consistently associating the first fixed location input key and the second fixed location input key with the encoded information identifying the first linked page and the second linked page, respectively, during a display period such that actuation of the first fixed location input key during the display period requests the first linked page for download from the remote source and actuation of the second fixed location input key during the display period requests the second linked page for download from the remote source.

2. A telecommunication apparatus according to claim 1 comprising respective fixed location input keys and wherein the processor associates each fixed location input key with the encoded information identifying a linked page.

3. A telecommunication apparatus according to claim 1, wherein the display period is the duration of the display of the received page.

4. A telecommunication apparatus as claimed in claim 1, wherein the fixed location input key is a dedicated key.

5. A telecommunication apparatus as claimed in claim 4, wherein the dedicated key is one of a group of alphanumeric keys provided for dialing.

6. A telecommunication apparatus as claimed claim 1, wherein the fixed location input key is a touch-sensitive area of the display.

7. A telecommunication apparatus as claimed in claim 1, wherein the caption is provided immediately above the fixed location input key.

8. A telecommunication apparatus as claimed in claim 1, wherein the remote source is a computer capable of connection to the World Wide Web (WWW).

9. A telecommunication apparatus as claimed in claim 1, wherein the apparatus comprises a markup language decoder.

10. A telecommunication apparatus as claimed in claim 1, wherein the association between the fixed location input key and the link is achieved by means of a particular tag in the page of information.

11. A telecommunication apparatus as claimed in claim 1, wherein the apparatus is mountable in a vehicle.

12. A telecommunication apparatus as claimed in claim 1, wherein the apparatus is a portable wireless telecommunication apparatus.

13. A telecommunication apparatus as claimed in claim 1, wherein said display is configured to display each caption associated with a fixed location input key among the at least first fixed location input key and the second fixed location input key, closer on the display to the associated fixed location input key than to any other fixed location input key among the at least first fixed location input key and the second fixed location input key.

14. A method of requesting the download of pages of received information from a remote source in a portable apparatus, which comprises at least a first fixed location input key and a second fixed location input key aligned at an outside edge of a display, said portable apparatus further comprising:

receiving in the portable apparatus a first page of information including encoded information identifying at least a first link and a second link to other pages, the first and the second link comprising visual elements indicative of the links and location elements to be used for downloading the other pages;

assigning the first and the second links from the encoded information to the first and the second fixed location input keys, respectively;

separating the visual and location element for the first and the second assigned links;

displaying on the display of said portable apparatus said first page of information and the visual elements for the first and the second assigned links, said visual elements being displayed aligned at an inside edge area of the display, in close proximity to the outside edge, in positions corresponding to the locations of the first and the second fixed location input keys, respectively;

allowing the user to actuate at least one of the first and the second fixed location input keys during a display period;

determining the link assigned to the actuated fixed location input key; and downloading a second page of information based on the location element comprised in the determined link.

15. A method according to claim 14, wherein the visual element for the at least one assigned link is provided above the respective at least one fixed location input key.

16. A method according to claim 14, wherein the remote source is a computer capable of connection to the World Wide Web (WWW).

17. A method as claimed in claim 14, wherein each caption is associated with a fixed location input key among the at least first fixed location input key and the second fixed location input key, and each caption is displayed closer on the display to the associated fixed location input key than to any other fixed location input key among the at least first fixed location input key and the second fixed location input key.

* * * * *